Patented May 8, 1945

2,375,402

UNITED STATES PATENT OFFICE 2,375,402

METHOD OF REDUCING THE CARBON-FORMING TENDENCY OF CATALYTIC MASSES

Ben B. Corson and Constantine D. Maxutov, Chicago, Ill., assignors to Universal Oil Products Company, Chicago, Ill., a corporation of Delaware No Drawing. Application September 8, 1939, Serial No. 293,925

4 Claims. (Cl. 252—248)

This invention concerns improvements in catalytic composites suitable for hydrocarbon conversion. More particularly the process relates to improved methods of manufacturing catalysts useful for the dehydrogenation of paraffin and olefin hydrocarbons, both gaseous and liquid, as well as for the dehydrogenation of naphthenic hydrocarbons, and to the cyclization of paraffins or olefins to aromatics.

More specifically, the invention is concerned with catalytic masses of particular composition which are useful in hydrocarbon dehydrogenation reactions. These catalysts are outstanding and specific in the matter of selectively promoting dehydrogenation reactions to the exclusion of the non-catalytic thermal reactions under the preferred conditions of operation.

The paraffin hydrocarbons, either normally gaseous or low boiling liquids, which may be converted by the catalytic composites of this invention, occur in large quantities in natural gas as well as gases obtained during the production of crude oil, comprising the so-called casing-head and natural gasoline fraction of the petroleum industry. Added to these in some cases are the gases and low boiling normally liquid fractions recovered from cracking plant operations.

In the past the greater part of paraffin gas production has been used for domestic and industrial fuel purposes, and not as a source of hydrocarbon derivatives because of the relatively unreactive character of the paraffinic constituents in comparison with the corresponding olefin hydrocarbons. Processes have been devised for the conversion of normally gaseous hydrocarbons into higher boiling liquids. For example, gases consisting of a mixture of propene and butenes with the corresponding saturated hydrocarbons can be converted by polymerization and alkylation reactions into relatively high antiknock motor fuel. Since the supply of low boiling olefin hydrocarbons has been more or less limited to those produced during cracking and reforming processes, the quantity of motor fuel available from these sources is relatively limited.

The catalysts of the present invention when employed in processes for the dehydrogenation of paraffinic gases can be used to augment the quantities of normally gaseous olefins available, and thus increase the potential quantities of motor fuel from this source. Moreover, such hydrocarbons may be used in other chemical reactions for producing valuable products such as dienes and aromatics, which in turn may be used as raw materials in organic synthesis.

In one specific embodiment the present invention comprises an improved catalytic mass useful for dehydrogenation and cyclization of hydrocarbons which comprises a relatively inert carrier having deposited thereon a minor amount of a compound, and particularly an oxide, of a metal selected from the 4th, 5th, and 6th groups of the periodic table, said mass being heated at a temperature within the range of 700–1100° C. to reduce the carbon-forming tendencies thereof.

The catalysts of the present invention consist essentially of carriers which are themselves relatively inert, having deposited thereon a compound and particularly an oxide of an element selected from the left-hand column of the 4th, 5th, and 6th groups of the periodic table including titanium, zirconium, hafnium, thorium, vanadium, columbium, tantalum, chromium, molybdenum, tungsten and uranium. The carriers used for these masses are preferably alumina or magnesia, but also may include silica or natural forms of silicates, silica gel, fuller's earth, montmorillonite, bauxite and the like. In addition to the above-mentioned compounds, the catalytic masses may contain relatively minor amounts of magnesia or zinc, which have the property of rendering the catalytic mass somewhat more stable to the effects of high temperatures over relatively long periods of time. In this way, catalytic masses are formed which have a high degree of activity and the catalytic activity of which is not reduced when subjected to the relatively high temperatures of reactivation over extended periods of time.

There are several methods by which the active oxides of the above-mentioned elements can be deposited on the carrier to produce highly active catalytic composites. According to one method, a powdered carrier is contacted with a solution of a salt of the element to be used, after which the mixture is dried and further impregnated with additional quantities of the salt in order to increase the concentration of the active element to the desired point. The hydroxide of the element may then be precipitated on and in the pores of the carrier by the addition of a suitable reagent such as ammonium hydroxide or other volatile alkali, after which the mass is dried, ground to a powder and formed into shapes such as pellets, spheres, etc.

According to another method of preparation, the carrier is intimately mixed in wet form with powdered oxides of the materials to be used, followed by drying.

In another method of preparation, the carrier may be impregnated with a suitable compound of the desired catalytic agent such as, for example, the oxalate or nitrate, after which the impregnated mass is dried, pelleted and calcined.

The composition of the catalysts may vary over a considerable range and the final catalytic mass usually contains up to approximately 25% or more by weight of the catalytic material, and is preferably in the range of 5-25%.

The dried masses are heated to a temperature within the range of approximately 700-1100° C. for a period of time of 15 hours to 30 minutes.

The time of heating will necessarily depend on the temperature used, and is shorter for the higher temperatures than for the lower temperatures. At temperatures of 1000° C. for example, a time of 30 minutes to 2 hours may be used, while at 1100° C. a time of not more than 1 hour and preferably approximately 30 minutes may be used. On the other hand, at temperatures of 700-900° C. a time of 6-15 hours is required to produce substantial decreases in the carbon-forming tendencies of the catalyst without a corresponding decrease in catalytic activity. At temperatures of 900-1000° C. the time period is 6 to 0.5 hours. In previous operation, the catalyst is normally heated at the operating temperature of the process in which it is employed for a short time prior to use.

Although the catalysts are normally used as formed shapes or particles packed in tubes or reaction chambers, the use of the catalytic composites in the form of finely divided powders carried in the gas stream during the reaction period is also practiced. In manufacturing powdered catalysts, the operation is the same as previously described, except that the step of forming into shapes is omitted. The catalyst is usually ground to uniform mesh before being used.

The temperatures of hydrocarbon conversion carried out with these catalysts are within the range of approximately 450-700° C. and the pressures from approximately 0.25 atmosphere to superatmospheric pressure of the order of 50-100 pounds per square inch. The contact time may vary considerably, depending on the stock being processed and the reaction being carried out. For the dehydrogenation of normally gaseous hydrocarbons to produce mono-olefins, the time ranges from approximately 0.5 to 6 seconds. For reforming and isomerizing normally liquid hydrocarbons, up to 60 seconds contact time may be employed.

The calcination step may be carried out using any suitable type of apparatus such as stationary or rotating kilns, muffle furnaces and the like, wherein time and temperature may be controlled within the limits stated.

The following example is given to illustrate the usefulness and practicability of our invention, but should not be construed as limiting it to the exact conditions or compounds described therein.

A catalytic mass was prepared by impregnating activated alumina with chromic acid followed by drying at a temperature of 300° C. Contained in the chromic acid during the impregnation step was approximately 5% of magnesium oxide for stabilizing the catalyst against depreciation in the high temperature ranges. The catalyst was ground to pass 30 mesh, mixed with a hydrogenated vegetable oil, and compressed into pellets. The pellets were then heated at temperatures of 700, 800, 900, 1000 and 1100° C. for periods of time ranging from 15 minutes to 15 hours. The catalytic activity of the heated catalysts thus produced were determined by passing butane over the catalyst at a temperature of 600° C., substantially atmospheric pressure and a space velocity of 1500 for a period of 45 minutes. The recovered gas was analyzed for olefins containing 3 or more carbon atoms. The catalyst was purged with nitrogen to remove residual gases and analyzed for carbon deposited thereon.

The following table shows the results obtained from these tests. The activities are reported on the basis of the original activity equal to 100, thus an activity of 86% means that the catalyst is 86% as active as it was prior to treatment. Carbon formation is reported in terms of per cent reduction in amount of carbon deposit. Thus a reduction in carbon formation of 80% means that the catalyst formed only 80% of the amount of carbon formed by the catalyst prior to treatment. All of these determinations are based on the test conditions outlined above.

| Temp., °C. | Time, hours | | | | | | | | | |
|---|---|---|---|---|---|---|---|---|---|---|
| | 1 | | 2 | | 6 | | 10 | | 15 | |
| | Per cent activity | Per cent reduction in C formation | Per cent activity | Per cent reduction in C formation | Per cent activity | Per cent reduction in C formation | Per cent activity | Per cent reduction in C formation | Per cent activity | Per cent reduction in C formation |
| 700 | 100 | 0 | 100 | 0 | 100 | 25 | 100 | 28 | 100 | 65 |
| 800 | 100 | 18 | 100 | 25 | 100 | 40 | 100 | 44 | 100 | 76 |
| 900 | 100 | 30 | 100 | 40 | 100 | 62 | 96 | 70 | 94 | 85 |
| 1,000 | 100 | 68 | 100 | 76 | 94 | 84 | 90 | 88 | | |
| 1,100 | 86 | 80 | 84 | 88 | 56 | 90 | 32 | 92.5 | | |

The results in the preceding table show that carbon formation is decreased at any given temperature with increasing time. The activity of the catalysts begins to decrease if heated at a temperature above approximately 1000° C., although considerable catalytic activity is maintained if the heating is not extended beyond two hours in this range. At the lower temperatures, longer periods of heating can be carried out without excessive decrease in catalytic activity. Thus it will be seen that considerable decrease in carbon-forming tendencies can be obtained without substantial loss in catalytic activity.

These tests have been confirmed during commercial operation using a similar catalyst for the dehydrogenation of butane gas.

We claim as our invention:

1. In the manufacture of hydrocarbon dehydrogenating catalysts, the method which comprises forming a non-ferrous composite of a major proportion of a relatively inert carrier and a minor proportion of a compound of an element selected from the left-hand columns of groups 4, 5 and 6 of the periodic table, calcining the non-ferrous composite, prior to its use in hydrocarbon dehydrogenation and regeneration, at a temperature in the range of 700-1100° C. and a time period of from 15 to 0.5 hours, and correlating the time and temperature of heating to provide a time period of 15–6 hours for the temperatures from 700 to 900° C., a time period of 6 to 0.5 hours for the temperatures from 900 to 1000° C. and a time period of 2 to 0.5 hours for the temperatures in excess of 1000° C.

2. The method as defined in claim 1 further characterized in that said carrier comprises alumina.

3. The method as defined in claim 1 further characterized in that said composite comprises a major proportion of alumina and a minor proportion of chromia.

4. The method as defined in claim 1 further characterized in that said composite comprises a major proportion of alumina and minor proportions of chromia and magnesia.

BEN B. CORSON.
CONSTANTINE D. MAXUTOV.